Patented June 8, 1954

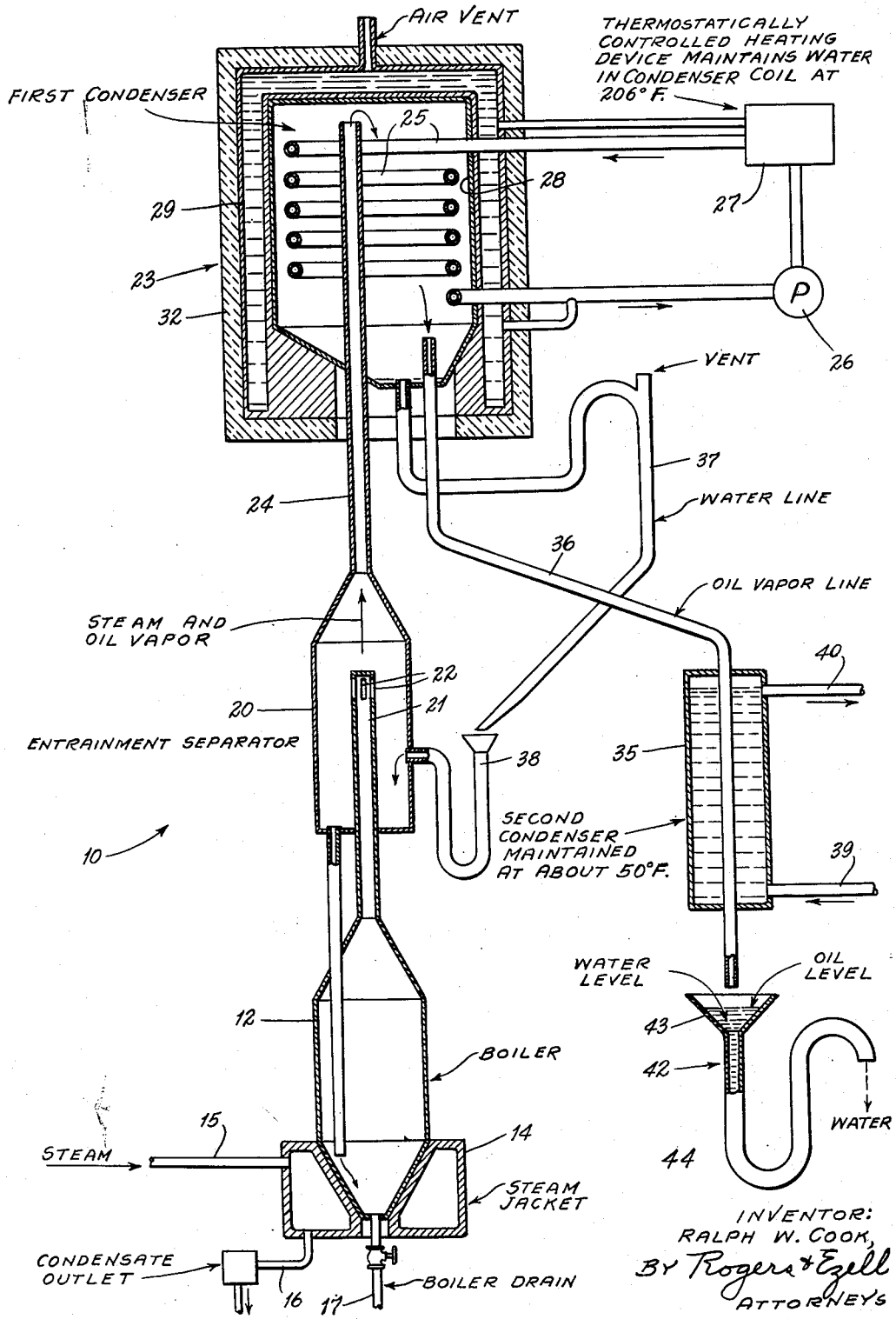

2,680,708

UNITED STATES PATENT OFFICE 2,680,708

APPARATUS FOR RAPID DETERMINATION OF PEEL OIL IN CITRUS FRUIT AND THE LIKE

Ralph W. Cook, Dunedin, Fla., assignor to Clinton Foods Inc., New York, N. Y., a corporation of Delaware Application March 24, 1950, Serial No. 151,786

1 Claim. (Cl. 202—186)

The present invention relates generally to methods of and an apparatus for rapidly separating for measurement one of two mixed insoluble liquids where the volume of one is much smaller than the volume of the other, and more particularly to the application thereof to the rapid determination of the amount of peel oil in citrus juices.

In brief, the present novel method of rapidly determining the amount of one liquid of two mixed insoluble liquids where the volume of one is much smaller than the volume of the other, such as, for example, the rapid determination of the peel oil content of orange juice, includes the rapid boiling of a known quantity of the orange juice in an air exhausted apparatus to separate the peel oil as an oil vapor from the mixed liquids along with steam and water droplets, passing the resulting steam, liquid, and oil vapor through an entrainment separator to remove the liquid, passing the oil vapor and steam through a condenser of a temperature slightly higher than the temperature at which the peel oil and steam mixture would boil under theoretical equilibrium conditions to separate the steam, passing the oil vapor with its still small amount of steam and any non-condensible gases through a second condenser at a temperature of around fifty degrees Fahrenheit or lower, at which point the oil becomes liquid again and may be measured in a suitable receiving container, the amount of water present not being large enough to interfere with the measurement of the oil. To simplify measurement of the oil, preferably a predetermined amount of citrus juice, such as a liter, is initially introduced into the apparatus. The novel apparatus contemplates the combination of the several condensers, the boiler, the separator, and the connecting elements by which the present novel method is carried out.

Therefore, an object of the present invention is to provide a novel method of rapidly determining the peel oil content of citrus juice.

Another object is to provide a novel method of rapidly determining the peel oil content of citrus juice which is fast enough to enable the testing of citrus juice during processing so that the presence of excessive peel oil may be rectified during the processing, thereby eliminating waste.

Another object is to provide a novel method of rapidly separating for measurement or other purposes one liquid from a mixture of two insoluble liquids where the one liquid is of much smaller volume than the other.

Another object is to provide a novel method of rapidly determining the peel oil content of citrus juice which is very accurate in the obtained results.

Another object is to provide novel apparatus for carrying out the present novel method of rapidly determining the peel oil content of citrus juice.

Other objects are to provide a novel method of rapidly determining the peel oil content of citrus juice which is simple in its steps, in which the results are obtainable within a very few minutes from initiation of the tests, which may be carried out by operating personnel in an efficient manner with minimum instruction, and which finds wide application in respect to determining the content or volume of one of two mixed insoluble liquids where the volume of the one liquid is very much smaller than the volume of the other liquid.

The foregoing and other objects and advantages are apparent from the following description taken with the accompanying drawing, in which:

The figure is a diagrammatic layout of novel apparatus by means of which the present novel method of rapidly determining the peel oil content of citrus juices, or the like, may be carried out.

Referring more particularly to the drawing before considering the steps of the present novel method of rapidly determining the peel oil content of citrus juices, there is disclosed a novel separator apparatus 10 by means of which one liquid of small volume can be rapidly separated from a mixture of two insoluble liquids for measurement or other purpose. The apparatus 10 includes a suitable boiler 12, extending around the lower part of which is a steam jacket 14 feeding into which is a steam inlet pipe 15 and out of which stems a condensate outlet pipe 16. A valved boiler drain 17 leads from the bottom of the boiler 12. Above the boiler 12 is an entrainment separator 20 into which a tube 21 forming a part thereof leads from the boiler 12. The upper end of the tube 21 is closed, slots 22 being formed therein. Bubbles are broken in passing through said slots 22 and in striking the walls of the entrainment separator 20 at an angle. The entrainment separator 20 is connected with a condenser 23 by means of a tube 24.

Any suitable condenser 23 may be employed, that disclosed including a coil 25 in which water or other liquid is moved by a pump 26 and is maintained at a selected temperature, which is substantially two hundred and six degrees Fahrenheit when rapid determination of citrus fruit peel oil content is in process, by a thermostatically controlled heating or cooling device 27, as required. The coil 25 is disposed in a receptacle 28 which is surrounded on the sides and top by a jacket 29 in which is circulated water or the like at substantially two hundred and six degrees Fahrenheit where peel oil determination is concerned. Circulation and temperature control of water or the like in the jacket 29 are effected by the aforementioned pump 26 and device 27, as indicated in the drawing.

Insulation 32 surrounds the jacket 29. Leading from the bottom of the receptacle 28 for return of water to the boiler 12 by way of the entrainment separator 20 is a vented tube 37 which feeds into a funnel mouthed trapped tube 38 tapping the entrainment separator 20 as illustrated. Juices or other liquids to be tested are fed to the boiler 12 by way of the funnel mouthed tube 38.

A second condenser 35 is connected with the interior of the receptacle 28 by a tube 36 which may be of stainless steel, glass, or other suitable material which reduces to a minimum the sticking of oil or the like.

Water or the like at a temperature of about fifty degrees Fahrenheit or lower enters the condenser 35 by a line 39 and leaves the same by a line 40. It is to be understood that suitable pump and cooling means are provided for maintaining the water in the condenser 35 at the desired low temperature (not shown).

Below the tube 36 is a measuring device 42 which is shown as comprising a conical measuring cup portion 43 and a return bend water holding and drain portion 44.

The present novel method of rapidly determining the peel oil content of citrus juice or the like utilizes apparatus such as the apparatus 10 described above. Assuming that steam is passing through the steam jacket 14, that water at about two hundred and six degrees Fahrenheit is coursing through the coil 25 and the water jacket 29, and that water in the second condenser 35 is being maintained at fifty degrees Fahrenheit or below, a pint or so of water is placed in the boiler 12 through the funnel mouthed tube 38 and permitted to boil. The steam from this quantity of water will clear out any air from the apparatus 10 which is necessary for accurate peel oil or other determination. It is advisable to thus boil a small amount of water before each test run.

With the water previously mentioned boiling in the boiler 12, a liter or other predetermined quantity of orange juice or other citrus juice is poured into the boiler 12 at a rate slow enough so that the water there does not cease its boiling action. After the liter of orange juice is in the boiler 12, it is permitted to boil for five minutes and the peel oil of the liter of orange juice is then immediately measured at the measuring cup 43. All of the contained peel oil of the liter of orange juice will have passed through the apparatus 10 within the five minute period and can be measured immediately and directly in the measuring cup portion 43 of the member 42. Hence, the present method of determining peel oil content of citrus juices and the like is extremely fast and accurate.

In further explanation of the present novel method of rapidly determining the peel oil content of citrus juices and the like, the rapidly boiling orange juice placed in the boiler 12 boils off all of the contained peel oil, which, together with steam, water bubbles and spray, pass upwardly through the tube 21 into the entrainment separator 20 where the bubbles and spray are separated from the steam and oil vapor. The steam and oil vapor continue upwardly through the tube 24 into the first condenser 23, the separated liquid returning to the boiler 12 by way of the tube 22. In the condenser 23 most of the steam in the steam-oil vapor mixture is condensed and returns to the boiler 12 by way of the tube 38, the entrainment separator 20 and the tube 22. The steam only condenses because the temperature of the condenser is maintained at about two hundred and six degrees Fahrenheit, a temperature slightly higher than the temperature at which a mixture of orange peel oil and water would boil under theoretical equilibrium conditions at atmospheric pressure. This water condensed by the condenser 23 is totally free of peel oil.

The oil vapor and a small amount of steam and any non-condensible gases present pass by way of the tube 36 into the second condenser 35, the temperature of which is maintained at fifty degrees Fahrenheit or below. The peel oil vapor condenses to a liquid as does the remaining amount of steam and both pass into the measuring cup portion 43 of the member 42, the peel oil remaining on top and the water draining to some suitable place. The peel oil may be accurately measured at the measuring cup portion 43 and the percentage of peel oil in the original liter of orange juice immediately determined by a provided chart or mathematical computation.

It is manifest that the speed with which the present novel method of rapidly determining the peel oil content of citrus juices and the like accomplishes the desired results. It may be employed to determine the peel oil content of orange juice or the like during its processing which cannot be accomplished with other known methods of measuring peel oil content of citrus juices. Hence, any peel oil overage can be immediately rectified. The Clevanger apparatus employed by the Department of Agriculture as a standard method of measuring peel oil takes about one and a half hours from start to finish in comparison with the present operation which takes less than ten minutes including the starting time of a particular run. Furthermore, superior results are obtained from the present method, numerous true comparison runs always resulting in a greater percentage of peel oil determined by the present method against the Clevanger method. De-oiled orange juice re-run through the presently disclosed apparatus 10 under the present novel method results in the obtaining of no additional peel oil.

It is clear that the present novel method may be employed to determine the volume of one liquid of a mixture of two insoluble liquids where the volume of the one liquid is much smaller than the volume of the other, and the temperature of the first condenser is maintained slightly above the temperature at which a mixture of the two liquids under consideration would boil under theoretical equilibrium conditions. If used on oil contaminated with water, dry oil would be removed from the first condenser and an oil-water mixture from the second. If used on water contaminated with oil, pure water would be removed from the first condenser and a mixture from the second. If the present novel method is used at a pressure above or below atmospheric pressure, or at high altitudes, the temperature in the first condenser would be adjusted to a point slightly above the theoretical equilibrium boiling point at the instant pressure.

It is manifest that no calibration is involved here in regard to the determination of the amount of peel oil or of the amount of the particular liquid under consideration. The peel oil is measured direct by volume, since it is known how much juice is placed in the boiler 12 and how much peel oil is removed. It is to be noted that the entire amount of a selected volume of liquid may be changed into steam in the boiler 12.

It is also to be pointed out that the short period of the test run, namely, five minutes plus pouring time, does not afford an opportunity for a chemical reaction by the oil. There is no trapping of oil in the apparatus and only a very minor amount of oil remains in the second condenser 35, the amount being negligible.

It is manifest that there have been provided a novel method of rapidly determining the peel oil content of citrus juices and of determining the volume of any liquid of two mixed insoluble liquids where it is much smaller in volume than the other liquid, and a novel apparatus for carrying out the present method, which fulfill the objects and advantages sought therefor.

It is to be understood that the foregoing description and the accompanying drawing have been given by way of illustration and example. It is also to be understood that changes in form of the several parts, substitution of equivalent elements or steps, and rearrangement of parts or steps, which will be readily apparent to one skilled in the art, are contemplated as within the scope of the present invention which is limited only by the claim which follows.

What is claimed is:

Apparatus for rapidly determining the volume of one liquid of a mixture of two mutually insoluble liquids where the volume of the one liquid is much smaller than that of the other liquid comprising boiler means for rapidly boiling a quantity of the liquid mixture under determination, means for separating and collecting entrained droplets of the liquid mixture from a vapor mixture leaving said boiler means, first condensing means for receiving a vapor mixture leaving said separating and collecting means and for condensing the major portion of the vapor of the other liquid, means for returning the condensate from said first condensing means to said separating and collecting means for admixture with droplets collected therein, means for returning admixed droplets and condensate from said separating and collecting means to said boiler means to insure evaporation of all of said one liquid, second condensing means for condensing the vapor leaving the first condensing means, collecting means for receiving the condensate from said second condensing means, and means for measuring the volume of said one liquid received in said collecting means.

References Cited in the file of this patent

UNITED STATES PATENTS

| Number | Name | Date |
| --- | --- | --- |
| 498,830 | Watel | June 6, 1893 |
| 1,730,892 | Leslie | Oct. 8, 1929 |
| 2,054,096 | Potts et al. | Sept. 15, 1936 |
| 2,423,746 | Zahm | July 8, 1947 |

OTHER REFERENCES

Journal of the American Pharmaceutical Association, vol. 17, April 1928, pages 345–349.

Journal of the Association of Official Agricultural Chemists, vol. 24, No. 1, 1941, pages 165–170.

Industrial and Engineering Chemistry, Analytical Edition, vol. 13, No. 6, June 15, 1941, pages 422 and 423.